United States Patent [19]

Little

[11] 3,999,195
[45] Dec. 21, 1976

[54] CAMERA ADJUSTABLE EXPOSURE CONTROL ADAPTER

[76] Inventor: Robert T. Little, 160 Columbia Heights Blvd., Brooklyn, N.Y. 11201

[22] Filed: Oct. 14, 1975

[21] Appl. No.: 622,163

[52] U.S. Cl. .............................. 354/60 L; 354/50; 354/60 R; 354/79; 354/266; 354/290; 350/19
[51] Int. Cl.$^2$ ..................... G03B 7/00; G03B 17/48
[58] Field of Search ................. 354/23, 31, 50, 51, 354/60 R, 60 L, 75, 76, 79, 266, 267, 268, 269, 290; 350/19

[56] References Cited

UNITED STATES PATENTS

| | | | |
|---|---|---|---|
| 3,292,490 | 12/1966 | Moore | 354/79 |
| 3,690,229 | 9/1972 | Kikuchi et al. | 354/60 R |
| 3,798,665 | 3/1974 | Eloranta et al. | 354/79 |
| 3,860,936 | 1/1975 | Harvey | 354/60 L |
| 3,898,678 | 8/1975 | Walworth | 354/79 |
| 3,900,858 | 8/1975 | McCann et al. | 354/79 |
| 3,911,451 | 10/1975 | Vockenhuber | 350/19 |

Primary Examiner—Russell E. Adams, Jr.
Attorney, Agent, or Firm—Lackenbach, Lilling & Siegel

[57] ABSTRACT

An adjustable exposure control adapter for cameras is described which includes a light producing source, such as a LED, which is mountable in juxtaposition to a photo cell forming part of the automatic exposure system of the camera. A hand unit, connected to the light source, includes a battery, a potentiometer and a series of switches. One switch is connected to the photo release mechanism of the camera while another switch, when closed, permits maximum current to flow through the light source to produce the maximum brightness which almost instantaneously closes the shutter. Another switch, when closed and the potentiometer has been set to a predetermined value, causes a current to flow through the light source which is less than the maximum with corresponding less light being emitted by the source. The light produced by the light source, being the only source of light for the photo cell of the camera automatic exposure system, automatically results in the appropriate exposure time to correspond to the preselected potentiometer setting. The exposure control adapter is particularly useful for astro-photography as well as micro-photography and in instances where the ambient light conditions do not produce the desired exposure times when only the camera's automatic exposure system is used. In fact, the exposure control adapter regulates the operation of an internal automatic exposure system by regulating the amount of light which is presented at the automatic exposure system photo cell independently of the ambient light which may be present when the photograph is taken.

14 Claims, 4 Drawing Figures

CAMERA ADJUSTABLE EXPOSURE CONTROL ADAPTER

BACKGROUND OF THE INVENTION

Most modern cameras include automatic exposure systems which, to some degree, control the diaphragm opening or the time during which the shutters are open to result in good exposure with a preselected film. While some cameras have a manual override which permits the internal automatic exposure system to be bypassed, many cameras do not have such an override and the camera automatically selects the picture taking parameters as a function of the ambient light which is normally detected by a photo cell which is mounted for detecting light from the general direction of the subject.

There are numerous problems which result in the taking of photographs under abnormal light conditions, such as in astro-photography and micro-photography. One of the primary problems with existing automatic exposure systems of cameras is the relatively small sensitivity of the photo cells used in connection therewith. For example, when the quantity of light decreases any appreciable amount from a bright sun condition, the response from the photo cells becomes minimal and, so far as the exposure system is concerned, there is very little or no light present. Under this condition, the automatic exposure system automatically select the longest exposure time which the camera is designed to provide. For example, the maximum exposure time of the Polaroid SX-70 Land camera, is up to approximately 14 seconds. However, for some planetary photography as well as to achieve special effects, exposure times of less than 14 seconds may be desired although the ambient light conditions would normally result in such a long term exposure.

With respect to cameras which have a manual override, the very same problems normally arise. Thus, unless a photographer knows the lens opening and the exposure time which would give him the well-exposed photograph or special effect from experience, a photographer under these circumstances would normally have to rely on an exterior light meter for detecting the level of ambient light. Such light meters then provide the proper camera setting for manually controlled cameras. As with the built-in exposure control systems, the photo cells of the external light meters similarly must respond to the ambient light condition. When the amount of light is small, the light meters will similarly provide erroneous information for certain types of astro or micro-photography or for special effects.

Although not directed to the problems to which the present invention is directed, there is known an apparatus for photographing oscilloscope traces with conventional cameras. When taking a photograph of an oscilloscope trace, the exposure is sometimes determined by the ambient light and not by the brightness of the trace itself. The apparatus which is intended for use with oscilloscopes is disclosed in U.S. Pat. No. 3,696,720. However, the device disclosed in this patent is not sufficiently versatile to permit the same to be used in astro-photography, micro-photography or any photography under extremely adverse lighting conditions. Thus, the adjustment control on the prior art apparatus under discussion only provides sufficient range of exposure sufficient to photograph oscilloscope traces which may be made to have a relatively constant intensity by adjustment of the oscilloscope intensity controls. For this reason, the limited range of exposure which the prior art device provides is generally acceptable. Clearly, since the light intensity of the oscilloscope traces can always be adjusted, the prior art device primarily serves the function blocking out ambient light which may confuse the circuit of the internal photo control system of the camera and substitute for the ambient light a light source which is the equivalent or substitute for the light emanating from the oscilloscope screen.

As suggested above, with respect to astro-photography and micro-photography, the lighting conditions are frequently much more adverse and, accordingly, it is important that any exposure control adapter be more versatile than the prior art device so that, depending upon the lighting conditions and the desired effect, either a manual or automatic mode of operation may be utilized.

SUMMARY OF THE INVENTION

It is, therefore, an object of the present invention to provide a camera adjustable exposure control adapter which is particularly suitable for use under adverse lighting conditions such as for astro-photography or micro-photography.

It is another object of the present invention to provide an adapter as above suggested which is simple in construction and economical to manufacture.

It is still another object of the present invention to provide an adapter as in the above objects which is sufficiently versatile to permit manual as well as automatic operation of the exposure control system.

It is yet another object of the present invention to provide an exposure control adapter for cameras having internal exposure control systems but which permits the camera to be used in astro-photography, micro-photography as well as in other types of photography where special effects are desired.

It is yet a further object of the present invention to provide an exposure or control adapter which may be easily attached in juxtaposition to the photo detecting element of a camera's automatic exposure system and which may be easily and conveniently manipulated to effect either manual or automatic control of the camera's internal automatic exposure system.

In order to achieve the above objects, as well as others which will become apparent hereafter, an exposure adapter for controlling the exposure of a camera, having an internal automatic exposure system which includes a light sensing element for detecting the ambient light conditions, in accordance with the present invention, includes camera actuation means connectable to the camera for effecting shutter opening to begin an exposure timing cycle. A source of light is provided the intensity of which may be selectively controlled. Mounting means is provided for mounting said source of light in juxtaposition of the light sensing element of the camera's internal exposure system. A voltage source of electrical potential is provided, and first selection means is utilized for applying substantially the full potential of said voltage source to said light source to produce the maximum intensity thereof upon actuation of said first selection means upon the lapse of the desired time interval. Said actuation of said first selection means and almost instantaneous emission of maximum intensity or maximum brightness light by the light source causes an almost instantaneous closing of the camera shutter at a termination of the timing cycle at the end of said desired time interval. Second selection means is provided for applying a portion of the potential of said voltage source to said light source to produce intermediate intensity light emission thereof upon actuation of said second selection means to effect a closing of the camera shutter after a predetermined time period corresponding to the intensity of said light source in accordance with the characteristics of the camera's internal exposure system.

DESCRIPTION OF THE PREFERRED EMBODIMENT

Figure 1:
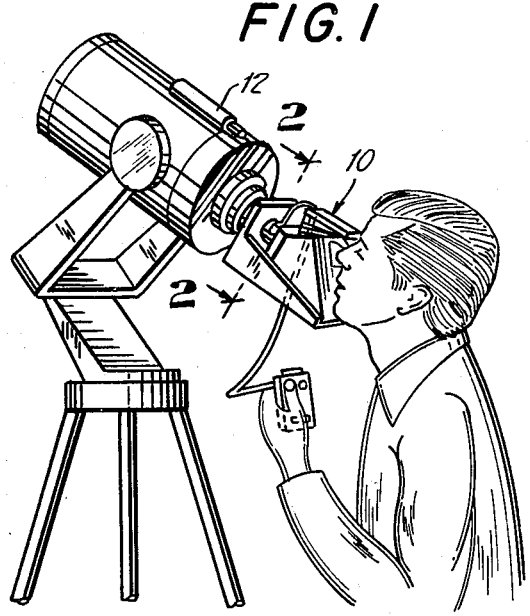
FIG. 1 is a perspective view of an SX-70 camera mounted on a telescope, showing how the exposure adapter of the present invention may be utilized to control the exposure during such astro-photography.

Referring now to the figures, wherein identical or similar parts are designated by the same reference numerals throughout, and first referring to FIG. 1, the exposure adapter will be described in conjunction with a Polaroid SX-70 camera. However, this is only illustrative and, as will become evident to those skilled in the art, the present invention may be used in conjunction with any camera which has an internal exposure system. The only limitation is that the light sensing element be to the side of the objective lens. Thus, the present invention may be used with all automatic cameras except for those that have behind-the-lens metering systems wherein the light which is detected by the light sensing element is light which has passed through the main or objective lens.

As suggested above, the exposure adapter of the present invention is particularly useful for controlling the operation of the internal exposure system of a camera under adverse lighting conditions. For this reason, the exposure adapter of the present invention is particularly suitable for astro-photography, micro-photography and photography which seeks to obtain special effects.

In FIG. 1, a Polaroid SX-70 camera 10 is shown mounted on a telescope 12 for photographing distant objects or celestial bodies. Because the objects of interest are distant it frequently occurs that the light which is reflected thereby is insignificant in comparison with the ambient light or extraneous light which passes through the telescope 12 and therefore into the camera 10. In FIG. 1, the adapter of the present invention, to be more fully described below, is shown attached to the camera 10 with the photographer holding the adapter's hand unit with which he can control the light which reaches the light-sensing element of the exposure control system. By regulating the quantity or brightness of light which reaches the internal exposure systems' light-sensing element, the exposure of the film may be controlled independently of the ambient light conditions around the camera.

Figure 2:
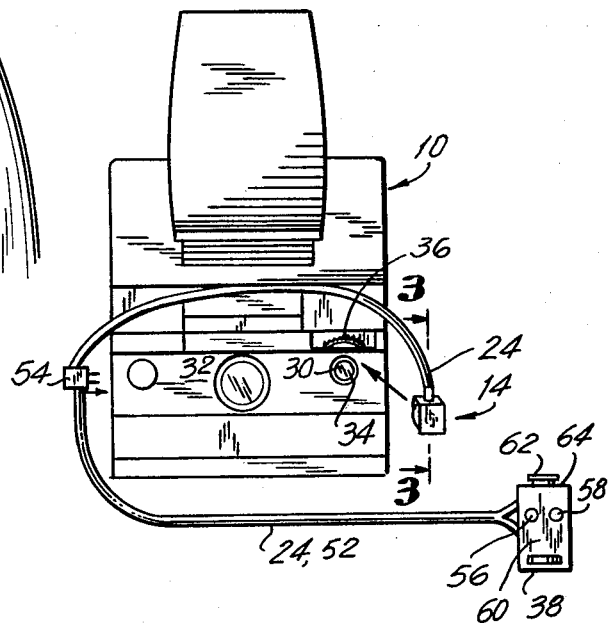
FIG. 2 is a perspective view of an SX-70 camera, looking down at the front of the camera, suggesting how the exposure adapter of the present invention is connected or coupled to the camera in order to control the automatic internal exposure system of the camera.
Figure 3:
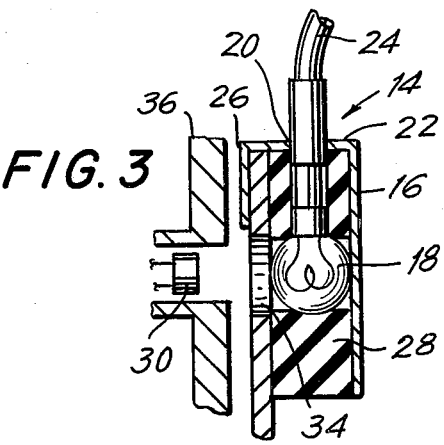
FIG. 3 is a fragmented cross-sectional view of the source of light and mounting bracket shown in FIG. 2, taken along line 3—3, and further showing the manner in which such bracket may be mounted on an SX-70 camera to regulate the light which is incident upon the light sensing element of the internal exposure system.

Referring to FIG. 2, the present invention is shown to include a first member 14 which is intended to be mounted or connected to the camera proximate to the light inlet opening for the internal light sensing element of the exposure system. The member 14 includes a generally L-shaped bracket 16 which houses a source of light 18, as shown in FIG. 3. The source of light 18 may be any light-emitting means, and may include incandescent bulbs as well as light-emitting diodes (LED). As will become evident from the description that follows, the only requirement for the light source 18 is that it is capable of emitting sufficient light intensity which, when such light impinges upon the light-sensing elements of an internal exposure control system of a camera causes the shutter mechanism to close almost instantaneously. It may be pointed out in this connection that the color of light emitted by the light source 18 is not in and of itself critical. Thus, variously colored LEDs including red, amber and green have been found to be suitable for this application, with varying degrees of advantage. In the presently preferred embodiment, a LED is utilized since such a device is somewhat more efficient and has smaller current requirements which can be satisfied by a small battery, as will be more fully described below.

As described above, the first member 14 includes a L-shaped bracket which is made out of a thin plate material. As viewed in FIG. 3, the horizontal, middle or connecting portion is provided with an aperture 20 therein for passage of wires 24 which carry the current to the LED 18. The bracket 16 also has a short downwardly extending flange portion or leg 26 which is receivable within a slot existing above the light sensing element of the Polaroid SX-70 camera.

In order to insure that the only light which impinges upon the light-sensing element of the internal exposure control system is that from the LED 18, there is provided a light shielding means in the nature of an annular or doughnut-shaped washer or gasket 28 which surrounds the LED 18. The dimensions of the bracket 16 as well as of the washer 28 are selected so that when the first member 18 is mounted on the camera 10, the camera's light-sensing element is in juxtaposed position with the LED. The washer or gasket 28 has a diameter greater than that of the opening in the camera for the light-sensing element so that the gasket 28 and bracket 16 fully cover the camera opening and shield any ambient or extraneous light from the internal light-sensing element. Accordingly, the only light which can reach the internal light-sensing element is that which is generated by the LED.

The bracket 16 as shown and described is particularly suitable for mounting the first member 14 on a Polaroid SX-70 camera since such a camera has a suitable slot for receiving the downwardly depending flange or lip 26. It should be clear that different cameras may require different mounting means. However, in each case, the object is to dispose the LED in juxtaposed position with the internal light-sensing element of the camera while blocking out all ambient and extraneous light therefrom. The manner in which the gasket or washer 28 is connected to the bracket 16 is not critical, and any conventional means for making such a connection may be used, such as by using adhesive.

Referring to FIG. 3, a cross-sectional representation of the salient features of the Polaroid SX-70 camera is shown. It will be noted that the light-sensing element or photo cell 30 is recessed behind a front surface or plate 32 of the camera 10. The plate 32 is provided with an aperture therein in which there is provided a lens or other transparent element which, among other things, protects the photo cell. Between the plate 32 and the main body of the camera there is provided a circular disc which serves as a limited control over the exposure, particularly when the backgrounds are very bright or very dark.

To attach the first member 14, then, to the camera 10, the flange or lip 26 is slipped into the space between the adjusting wheel or the exposure control wheel 36 and the front panel 32. In this way, the angular ring or washer 28 abuts against the front plate 32 to block out all ambient or extraneous light which may otherwise reach the photo cell 30.

Figure 4:
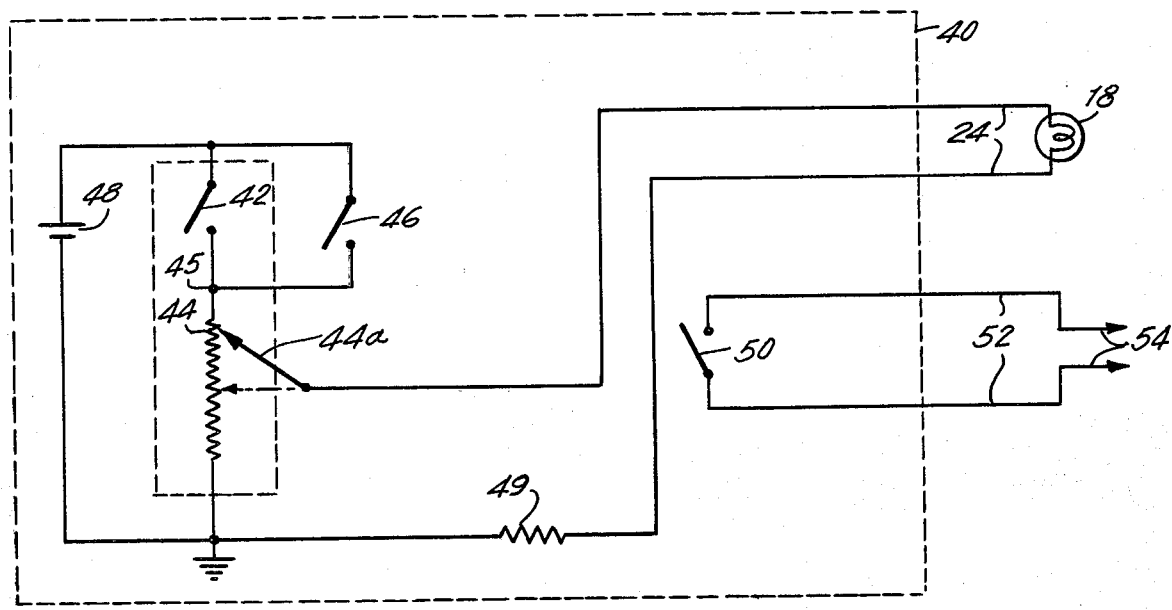
FIG. 4 is an electrical schematic diagram of the exposure adapter in accordance with the present invention.

Referring to FIGS. 2 and 4, the adapter of the present invention also includes a second member or a control box 38 which may be hand held and includes a source of energy or voltage source as well as the electrical circuitry for regulating the intensity of the LED 18 and, therefore, for regulating the internal exposure control system of the camera.

In FIG. 4, an electrical schematic of the circuit used in the present is shown. The box 40 shown in dashed outline represents the control box 38 and the circuitry which is within the control box is enclosed by the dashed outline 40.

The control box 38 contains a normally open switch 42 connected in series with a potentiometer 44. The switch 42 and the potentiometer 44 are connected to each other at a junction point 45. Connected in parallel with the switch 42 is a switch 46 which is normally open and is advantageously a momentary contact switch.

A battery 48 is connected across the series combination of the switch 42 and the potentiometer 44. The potentiometer 44 has a slider arm or output terminal 44a which may be moved between the end terminals of the potentiometer to vary the potential at the terminal 44a when the switch 42 is closed.

The LED 18 is connected by means of electrical conductors, leads or wires 24 between the common or grounded terminal of the potentiometer 44 and the slider arm or output terminal 44a. A resistor 49 is advantageously connected in series with the LED to limit the maximum current flowing therethrough to thereby prevent damage thereto.

While the potentiometer 44 is in the nature of a voltage divider and the switches 42 and 46 may be independent or individual switches, the switch 42 is advantageously coupled to the slider arm 44a so that when the switch 42 is in the open condition as shown, the slider arm 44a is at the junction point 45 or at the maximum level of potential. When the switch 42 is initially closed, the slider arm 44a is still at the junction point 45 and the switch 42 remains closed as the slider arm 44a is moved towards the ground or lower potentials. With this arrangement, it is clear that initial closing of the switch 42 or closing switch 46 with switch 42 open, results in the maximum potential being applied to the LED to produce the maximum brightness or light intensity. Movement of the slider arm 44a in a direction away from the junction point 45 results in a smaller potential being applied to the LED and, accordingly, would result in a lower brightness or intensity of light emitted by the LED.

The switch 42 and the potentiometer 44 constitute a selection means while the switch 46 constitutes a further selection means, each selection means being suitable to control the internal exposure system of the camera in a desired manner, as will be more fully described hereafter.

As suggested above, the switch 42 and the potentiometer 44 are coupled in such a manner so as to place the voltage divider output terminal 44a at the maximum potential setting when the switch 42 is open and initially closed. The switch 42 remains, however, closed in all the remaining lower settings of the voltage divider. In this manner, closure of either switch 42 or 46 applies the maximum potential at the output terminal 44a unless the voltage divider or potentiometer setting 44 is changed subsequent to closure of the switch 42. For this reason, the switch 42 and the potentiometer 44 are shown enclosed within a dashed box or outline. This is to signify that in the presently preferred embodiment the switch 42 and the potentiometer 44 are ganged together on a common shaft so that initial rotation of the shaft closes the first switch 42 while the slider terminal 44a is at the maximum potential setting thereof, or at the junction terminal 45. Further rotation of the common shaft causes the slider terminal 44a to move to positions of lower potential while the switch 42 is maintained in the closed condition.

With such an arrangement, once the switch 42 has been closed and the potentiometer slider arm 44a has been moved to an intermediate potential setting, accidental closure of the switch 46 will not override the desired or preselected setting of the potentiometer 44 since the switches 42 and 46 are in parallel and the current must in any event pass through the slider terminal 44a. On the other hand, when the switch 42 is open, and therefore the potentiometer output terminal 44a is at the maximum potential setting or at the junction 45, closure of the switch 46 similarly causes the maximum potential to be applied to the output terminal and therefore to the LED.

There is provided an additional switch 50 on the control box 38 which is connected by the leads or electrical conductors 52 to a connector plug associated with the camera's remote or electronic shutter or release mechanism. With such cameras, closure of the switch 50 electronically actuates the internal shutter mechanism and the shutter is opened to begin the exposure timing cycle.

With the above arrangement, closure of the switch 46 applies substantially the full potential of the battern 48 to the LED 18 to produce the maximum intensity of light that is necessary or desired upon actuation of the switch 46 upon the lapse of a desired time interval to thereby effect the most instantaneous closing of the camera shutter and the termination of the timing cycle at the end of the desired time interval. On the other hand, the switch 42 and the potentiometer 44 apply a portion of the potential of the voltage source or battery 48 to the LED 18 to produce an intermediate intensity light emission thereof upon actuation or closure of the switch 42 to effect a closing of the camera shutter after a predetermined time period corresponding to the intermediate intensity of the LED 18 in accordance with the characteristics of the camera's internal exposure system.

The leads or electrical conductors 24 and 52 permit the first member 14 to be fixedly mounted on the camera body while the hand held control box 38 is remote therefrom. This is particularly useful when long time exposure photographs are taken since the various switches on the control box 38 may be actuated without moving or disturbing the camera 10.

As suggested above, the switch 42 and the potentiometer 44 are advantageously ganged on a common shaft. When such a combination switch-potentiometer is utilized, the shaft is extended exteriorly from the control box 38 and a dial 62 is mounted on the shaft for rotation about the axis of the shaft relative to a scale 64 which is provided on the control box. At one rotational end position of the dial 62, the switch 42 is open and the slider arms 44a is at the maximum potential position or at the junction point 45. Initial turning of the dial 62 closes the switch 42 while the slider or output terminal 44a is still at the maximum potential setting. Continuing the rotation of the dial, however, moves the output terminal 44a in the direction of the grounded potentiometer terminal or towards positions of lower potential. The switches 46 and 50 are provided on the face of the control box 38 and conveniently positioned to facilitate depression of either switch while the control box is held in the hand of the photographer.

The adapter of the present invention permits both manual as well as automatic time exposures. In the automatic mode, the time exposures can be from a fraction of a second to the maximum timing cycle for which the camera is designed. With the SX-70, the internal exposure mechanism permits exposures from a fraction to a maximum of approximately 14 seconds. In the case of the SX-70, in order for the photo cell 30 to "read" the light from the LED 18, it is important to set the exposure control dial on the camera to maximum dark.

The operation of the exposure adapter will now be described to the extent to which it has not been described above. In both the manual as well as automatic modes, the first member 14 is clipped on to a camera to position the LED 18 in juxtaposed position with the opening in the camera body for the internal photo cell. As described above, such mounting procedure may vary from camera to camera depending on its construction.

To take a picture in the manual mode, the dial 62 is maintained in its end-most rotational position to maintain the switch 42 open and, therefore, the slider arm or output terminal 44a at the junction 45 as described above. Once the camera is properly positioned and focused, the actuation switch 50 is closed to actuate the shutter mechanism and start the timing cycle. Since both switches 42 and 46 are still open, there is no potential applied to the LED 18 and no light is emitted therefrom. Under this condition, the photo cell 30 does not detect any light and maintains the shutter mechanism open for the maximum time period designed. In the case of the SX-70, as mentioned above, this time period is 14 seconds. If an exposure of less than 14 seconds is desired, say 5 seconds, a stop-watch is utilized to time the interval from the moment that the switch 50 is depressed. When the five second period has elapsed, the switch 46 may be depressed to apply the maximum potential to the LED 18. At such time, the LED 18 emits the maximum brightness or intensity of light and the shutter closes almost instantaneously as soon as this very bright intensity light is detected by the photo cell 30.

In the automatic mode, the dial 62 is initially turned from its end-most position to firstly close the switch 42. The dial 62 is then turned to a desired position, selected from the calibrated scale on the control box 38, to bring the slider arm 44a to an intermediate position on the potentiometer 44. With less than the maximum voltage applied to the LED 18, a lower intensity light is produced which impinges upon the photo cell 30. However, until the switch 50 is closed, the timing cycle does not commence. Accordingly, after the dial 62 has been moved to its desired selected position, the photo actuation switch is closed and remains open for a period of time which is determined by the internal exposure control system and based on the intensity of light which impinges upon the photo cell 30. Depending on the position of the slider arm 44a, the potential which is applied to the LED 18 can range from the maximum amount to zero potential as the slider arm 44a moves from the junction point 45 to the ground or common point of the circuit. Accordingly, the timing cycle or exposure cycle can similarly be varied from a fraction of a second to the maximum time period which the camera is designed to provide.

Although rough exposure times have been estimated, and are set forth below, accurate exposure times can only be determined by trial and error. With respect to celestial or astro-photography, consideration must be made of a wide variety of atmospheric and exposure conditions, not the least of which are atmospheric changes and telescope vibrations. For example, if a photographer wants to take a 3 second exposure of Jupiter, the manual mode may be used, wherein the control dial 62 is turned to the "off" position. A stopwatch, as suggested above, or other timing device is used to time the duration of the exposure. After the 3 second interval, the switch 46 is depressed to terminate the exposure cycle. The following are suggested exposure times at the indicated f-stops or openings of the camera diaphragm: Full moon f:46 at 1 second exposure; Sun at f:46 with a suitable full aperture solar filter at ¼ second exposure; Jupiter at f:193 at 6 second exposure; and Saturn at f:97 at 8 second exposure. As described above, the exposure times can be obtained in the manual mode as well as in the automatic mode by turning the dial 62 to the appropriate position. The manual mode, in some cases, will be more accurate since the timing cycle and the automatic mode of the adapter is necessarily dependent on the condition of the battery 48. As the battery 48 becomes more discharged, the light intensity emitted by the LED 18 will be somewhat lower than that indicated or suggested by the dial 62.

It is to be understood that the foregoing description of the various embodiments illustrated herein is exemplary rather than definitive in nature, and various modifications to the embodiments shown herein may be made without departing from the spirit and scope of the invention.

What is claimed is:

1. An exposure adapter for controlling the exposure of a camera having an internal automatic exposure control system which includes a light sensing element for detecting the ambient light conditions, the adapter comprising camera actuation means connectable to the camera for effecting shutter opening to begin an exposure timing cycle; a source of light the intensity of which may be selectively controlled; mounting means for mounting said source of light in juxtaposition to the light sensing element of the camera's internal exposure system; a voltage source of electrical potential; first selection means for applying substantially the full potential of said voltage source to said light source to produce the maximum intensity thereof upon actuation of said first selection means upon the lapse of a desired time interval to thereby effect an almost instantaneous closing of the camera shutter and a termination of the timing cycle at the end of said desired time interval; and a second selection means for applying a portion of the potential of said voltage source to said light source to produce an intermediate intensity light emission thereof upon actuation of said second selection means to effect a closing of the camera shutter after a predetermined time period corresponding to the intensity of said light source in accordance with the characteristics of the camera's internal exposure system.

2. An exposure adapter as defined in claim 1, wherein said actuation means comprises switch means connected to the camera's electronic shutter release mechanism.

3. An exposure adapter as defined in claim 2, wherein said switch means comprises a remotely connected normally open momentary contact switch.

4. An exposure adapter as defined in claim 1, wherein said source of light comprises a light emitting diode the brightness of which is a function of the potential placed thereacross.

5. An exposure adapter as defined in claim 4, wherein said light emitting diode has a light emitting characteristic that causes the same to emit a substantial quantity of light sufficient to cause almost instantaneous closure of the camera's shutter when the full potential of said voltage source is applied across said light emitting diode and the resulting light is detected by the camera's light sensing element.

6. An exposure adapter as defined in claim 1, wherein said voltage source and light source are connected in a series circuit configuration, and wherein said first selection means comprises a normally open momentary contact switch interposed in series connection between said voltage and light sources, whereby closure of said switch applies the full potential of said voltage source across said light source.

7. An exposure adapter as defined in claim 1, wherein said second selection means comprises adjustable voltage divider means connected across said voltage source for providing a portion of the potential thereof at a pair of terminals, said source of light being connected to said terminals, the potential applied to said light source being selectable by adjustment of said voltage divider means.

8. An exposure adapter as defined in claim 7, wherein said voltage divider means comprises a potentiometer having two end terminals and a slider terminal, said source of light being connected to said slider terminal and to one of said end terminals.

9. An exposure adapter as defined in claim 7, wherein said selection means further comprises a normally open switch in series connection with said voltage divider means for placing the same across said voltage source only upon the closure of said switch, whereby said second selection means only applies a potential to said source of light when said switch is closed.

10. An exposure adapter as defined in claim 1, further current limiting means in series connection with said light source to prevent excessive current through the same and prevent damage thereto.

11. An exposure adapter as defined in claim 1, wherein said mounting means includes light shielding means for shielding the camera light sensing element when said light source is in juxtaposed position therewith, whereby only light generated by said light source reaches the sensing element.

12. An exposure adapter as defined in claim 11, wherein said shielding means comprises an annular washer surrounding said light source.

13. An exposure adapter as defined in claim 1, wherein said mounting means includes a generally L-shaped bracket made out of a thin plate material, the shorter leg of which is receivable within a slot above the light sensing element of the Polaroid SX-70 camera.

14. An exposure adapter as defined in claim 1, wherein said first selection means is only operative when said second selection means is inoperative.

* * * * *